United States Patent [19]

Amikura et al.

[11] Patent Number: 4,723,073
[45] Date of Patent: Feb. 2, 1988

[54] LIGHT EMISSION QUANTITY CONTROL DEVICE FOR FOCUS DETECTION

[75] Inventors: Takashi Amikura, Tokyo; Akihiro Fujiwara; Toshiaki Kawanishi, both of Kanagawa, all of Japan

[73] Assignee: Canon Kabushiki Kaisha, Tokyo, Japan

[21] Appl. No.: 893,532

[22] Filed: Aug. 4, 1986

Related U.S. Application Data

[63] Continuation of Ser. No. 680,392, Dec. 11, 1984, abandoned.

[30] Foreign Application Priority Data

Dec. 15, 1983 [JP] Japan ............................. 58-236729

[51] Int. Cl.⁴ .......................... G01J 1/20; G03B 3/10
[52] U.S. Cl. .................................... 250/201; 354/403
[58] Field of Search ............... 250/201, 204; 354/400, 354/402, 403

[56] References Cited

U.S. PATENT DOCUMENTS 4,367,027 1/1983 Stauffer .............................. 250/201

Primary Examiner—Gene Wan
Attorney, Agent, or Firm—Toren, McGeady & Associates

[57] ABSTRACT

In an automatic focus detecting device having a light projecting element for projecting light for focus detection onto an object to be photographed and a light receiving element for receiving the light reflected by the object, controls an imaging optical system moving to an in-focus position on the basis of an output signal of the light receiving element. The disclosed light emission quantity control device includes a counter for counting the light emission time of the light projecting element from the start thereof and increases the light emission quantity of the light projecting element after the lapse of a predetermined time counted by the counter.

6 Claims, 21 Drawing Figures

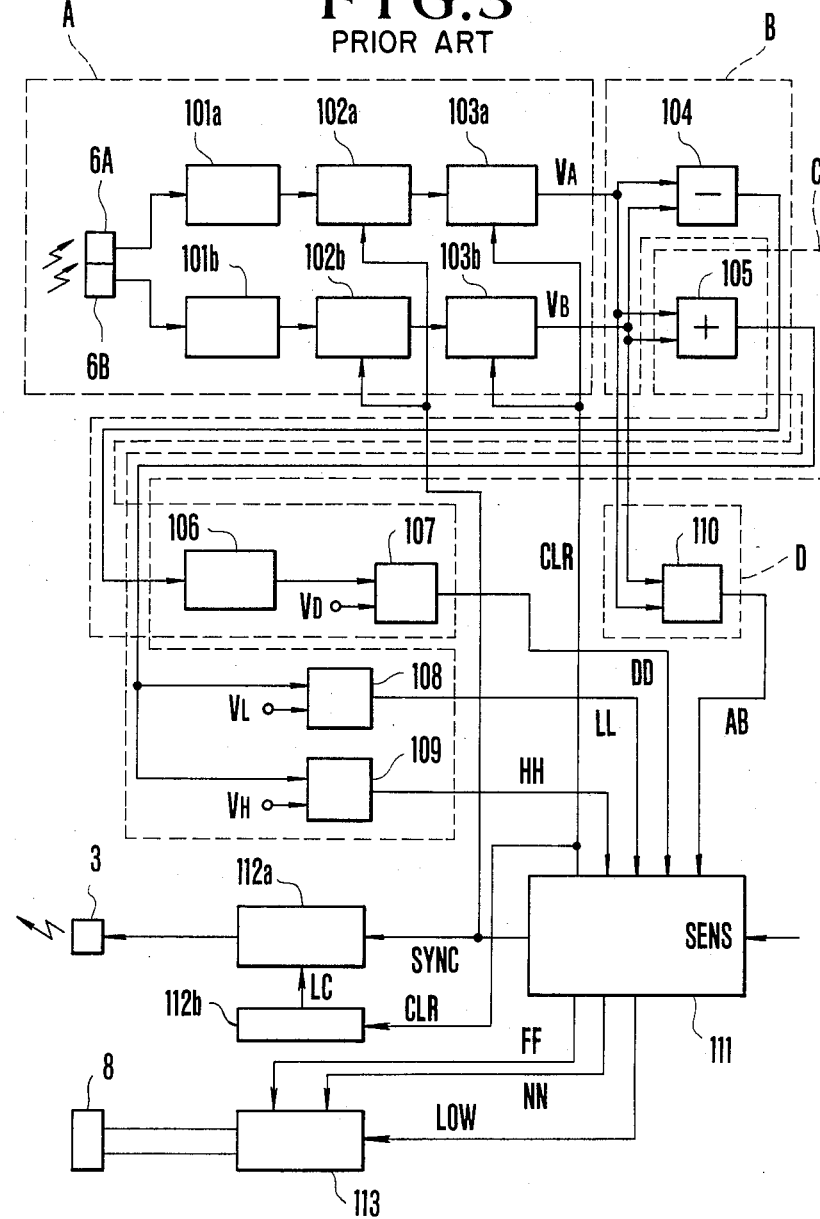

LIGHT EMISSION QUANTITY CONTROL DEVICE FOR FOCUS DETECTION

This is a continuation of application Ser. No. 680,392, filed Dec. 11, 1984, abandoned.

BACKGROUND OF THE INVENTION

1. Field of the Invention

This invention relates to a light emission quantity control device for focus detection.

2. Description of the Prior Art

An automatic focus detecting device having a light projecting element for projecting light for focus detection onto an object to be photographed and a light receiving element for receiving the light reflected by the object controls an imaging optical system moving to an infocus position on the basis of an output signal of the light receiving element and is well known.

Previously disclosed, in U.S. patent application Ser. No. 603,660 filed Apr. 26, 1984, was an automatic focus detecting device in which the above light receiving element is divided into two-photo-sensitive areas for receiving reflected light output signals of the photo-sensitive areas are detected and processed to compute and control the direction of movement of the imaging optical system (infinity distance direction or nearest distance direction) and the quantity of movement thereof (quantity or time of a current supplied to a motor).

The construction of the automatic focus detecting device of the above U.S. patent application is described below with reference to FIGS. 1–10.

FIG. 1 schematically shows the whole arrangement of an automatic focus detecting device (hereinafter referred to as the AF device). Shown in FIG. 1 are an imaging lens group 1 which is movable to effect photography focusing, serving as an imaging optical system, and an imaging plane 2 of an image sensor. Although the imaging plane 2, in this particular case, is that of an image pick-up tube, it may be either an imaging plane of a solid-state image sensor or a film surface. A light projecting element 3 projects rays of light into a field (or, in more generic terms, a distance measuring area) and is composed of a laser diode, an infrared ray emiting diode, or the like. A light projecting lens 4 forms a light spot image P of the light projecting element 3 on an object 5 to be photographed (or, in more generic terms, an object whose distance is to be measured). A light receiving element 6 includes two photo-sensitive areas 6A and 6B which produce separate outputs, the area 6A being disposed closer to the light projecting element 3 than the area 6B. This light receiving element 6 is composed of, for example, a two-area PIN photo-diode, a charge coupled device, or the like. A visible light cut filter FL allows light from the light projecting element 3 to pass therethrough as much as possible, while suppressing external ambient light. A light receiving lens 7 forms an image of the light spot image P reflected by the object 5 on the light receiving element 6. A motor 8 drives a photo-taking optical system and is interlocked with the lens group 1, the light projecting element 3 and the light receiving element 6 via cams or the like. An automatic focus detecting circuit 9 (hereinafter referred to as an AF circuit) operates the motor 8 in response to the output of the light receiving element 6 to move the lens group 1 to an in-focus position.

The automatic focus detecting device AF arranged as shown in FIG. 1 operates as follows. When the object 5 is located at a distance l2 from the imaging plane 2, reflected light of the light spot image P is received by the light receiving element 6 with the two photo-sensitive areas 6A and 6B receiving equal quantities of light, as shown in FIG. 2(a). In this instance, the difference VA−VB between integrated values VA and VB of outputs of these areas 6A and 6B, respectively, becomes zero. In terms of the optical path, the light emitted from the light projecting element 3 passes along an optical path b1 to impinge on and be irregularly reflected by the object 5 to be photographed. Some of the reflected light then passes along an optical path b2 to form an image on the light receiving element 6. The lens group 1 is, in this instance, considered to be at an in-focus position. If the object 5 moves to a location at a distance l1, the focal point of the lens group 1 shifts backward, so that the lens group 1 reaches a far-focus state. If the positions of the light projecting element 3 and the light receiving element 6 remain unchanged, the projected light follows the optical path b1 to be irregularly reflected by the object 5. The reflected light passes along an optical path a′2 to form an image on the light receiving element 6, and in this case, an image forming point on the light receiving element 6 greatly deviates toward the area 6B, as shown in FIG. 2(b). As a result, the difference VA−VB mentioned above no longer becomes zero.

Then, with the extent of this deviation correlated to the moving extent of the object 5, which is expressed as l2−l1, the lens group 1 is shifted to a new in-focus position. More specifically, the AF circuit 9 causes the motor 8 to rotate either forward or backward in response to the sign of the above difference VA−VB (including the value thereof in some case). Therefore, the light projecting element 3, the light receiving element 6 and the lens group 1 are shifted in an interlocked manner via cams or the like. The reflected light spot image P is thus adjusted to reach a middle point between the two areas 6A and 6B of the light receiving element 6, and an image of the object 5 located at the distance l1 is thus sharply formed on the imaging plane 2. As a result of this adjustment, the light projecting element 3 reaches a position 3′, the boundary line between the areas 6A and 6B of the light receiving element 6 reaches a new position 6′, and the position of the lens group 1 reaches a position 1′. In this case, the projected light path is indicated by b1 and the reflected light path is indicated by a′2. When the object 5 moves to a location at another distance l3, the lens group 1, etc. are shifted in a direction which is reversed from the above direction until the difference VA−VB becomes zero. The projected light path in this case is indicated by c1 and the reflected light path is indicated by c2.

The electrical circuit arrangement associated with the automatic focus detecting device AF described above is shown in FIG. 3. The reflected light spot image P received at the photo-sensitive areas 6A and 6B of the light receiving element 6, as mentioned in the foregoing, is photo-electrically converted into light information signals. The light information signals thus obtained are supplied to and sufficiently amplified by amplifiers 101a and 101b. The amplifiers 101a and 101b preferably have a sufficient amplification degree for the modulated frequency of an infrared ray to form the light spot image P, and to have a frequency characteristic of suppressing, as much as possible, the amplification for the frequency of such modulated light as unnecessary sunlight or commercial light sources. Outputs of the amplifiers 101a and 101b are supplied to synchronized detection circuits 102a and 102b and are subjected to synchronized detection. In this case, the synchronizing signal is of the same frequency as that of a light emission driving signal for the light projecting element 3 and is kept in a constant phase relation thereto. Outputs of the synchronized detection circuits 102a and 102b are integrated by integration circuits 103a and 103b and increase sometimes gradually at a rate proportional to the signal intensity of the reflected light spot image P. The integrated voltages VA and VB which are obtained from the integration circuits 103a and 103b, respectively, through the above signal processing operation are processed and determined by a computing circuit which will be described later herein, and are thus converted into digital information consisting of bits.

More specifically, the integrated voltages VA and VB are made into a difference signal VA−VB by a subtracter 104 and into a sum signal VA+VB by an adder 105. The difference signal VA−VB is supplied to an absolute value circuit 106 to produce a signal |VA−VB|. The value of this signal |VA−VB| is compared with a comparison value VD by a comparator 107 operating as comparison means, and the result of comparison is produced by the comparator 107. The sum signal VA+VB is compared with comparison values VL and VH by comparators 108 and 109 operating as level detecting means, respectively, and the results of comparison are produced by the comparators 108 and 109. In addition, the integrated voltages VA and VB are compared with each other by a comparator 110. The four digital information signals, that is, the outputs of the comparators 107, 108, 109 and 110, are supplied to a sequence control circuit 111 operating as determining means, in which the operation of the whole system is determined.

A light emission driving circuit 112a supplies a current to the light projecting element 3 in synchronization with a synchronizing signal from the control circuit 111 and controls light emission of the light projecting element 3.

A light emission quantity control circuit 112b detects the time when integration begins, depending upon a clearance signal produced by the control circuit 111 (the signal is at a low level during integration and reaches a high level at the time of integration termination). Having counted for a predetermined time, the light emission quantity control circuit 112b supplies a signal for changing the quantity of light emission, to the light emission driving circuit 112a to change and control the value of a current supplied to the light projecting element 3.

A motor driving circuit 113 controls the direction and speed of rotation of the photo-taking optical system driving motor 8 in response to a signal from the control circuit 111.

FIG. 4 shows the circuit arrangement of a part A shown in FIG. 3.

Low-noise operational amplifiers 201a and 201b disposed at the initial stages of the amplifiers 101a and 101b and feedback circuits 202a and 202b gave a high-pass characteristic to the circuit. Some portion of the energy of the infrared rays projected by the light projecting element 3 is reflected and returned to the light receiving element 6 together with some external light component. It is likely that this external light component may be of a large value compared with the returned energy. In combination with the visible light cut filter FL, the feedback circuits 202a and 202b relatively suppress the external light component, and are practical in obtaining the suppressing effect under most of the object 5 conditions. Furthermore, a DC component due to sunlightd, etc. is almost completely cut by capacitors 203a and 203b. AC amplifiers 204a and 204b sufficiently amplify the components in the proximity of the modulated frequency and supply the signals to the synchronized detection circuits 102a and 102b disposed at the next stage.

The synchronized detection circuits 102a and 102b are composed of inverters 205a and 205b, analog switches 206a and 206b and other analog switches 207a and 207b. The analog switches 206a, 206b, 207a and 207b are operated in response to a synchronizing signal SYNC to alternately select non-inverted signals and inverted signals.

In another embodiment, a method of obtaining the product of the input signal and the AC component of the synchronizing signal SYNC by means of a four-phenomenon analog multiplier (not shown) may be employed in place of the above arrangement.

The synchronized detecting signals SYNC become direct current (pulsating current) components to be supplied to the integration circuits 103a and 103b at the next stage. The integration circuits 103a and 103b are composed of operational amplifiers 208a and 208b, resistors 209a and 209b and capacitors 210a and 210b. Currents, which are proportional to the voltages of the synchronized detection outputs, flow from the synchronized detection circuits 102a and 102b via the resistors 209a and 209b to the capacitors 210a and 210b to be stored there. Then, these currents become integrated voltages to be produced from the operational amplifiers 208a and 208b. These voltages respectively correspond to the voltages VA and VB mentioned above. Analog switches 211a and 211b cause the electric charges which are stored at the capacitors 210a and 210b to each their initial states. These electric charges stored at the capacitors 210a and 210b are thus cleared in response to a clearance signal CLR from the control circuit 111 for a next electric charge storing process.

FIG. 5 shows, in detail, a part B of the circuit of FIG. 3, in which the integrated voltages VA and VB are processed to obtain the signal |VA−VB| which is to be compared with the comparison voltage VD. The integrated voltages VA and VB produced by the integration circuits 103a and 103b are subjected to a subtraction process at the subtraction circuit 104 composed of resistors 213 ∼ 216, each of which has the same resistance value R and an operational amplifier 212. A signal −VA+VB is obtained through this process. This signal −VA+VB is supplied to the absolute value circuit 106 at the next stage. The absolute value circuit 106 is composed of an operational amplifier 217, diodes 218 and 219, resistors 220, 221 and 222 of a resistance value 2R, and another resistor 223 of a resistance value R. The operational amplifier 217, the diodes 218 and 219 and the resistors 220 and 221 are arranged so that the cathode of the diode 219 has a high impedance upon receipt of a negative input and has a potential which is −1 times as high as an input voltage upon receipt of a positive input. As a result, a voltage value −0.5 |VA−VB| is applied to the negative input terminal of a comparator 224. With a voltage value −0.5 VD having been applied to the positive input terminal of the comparator 224 beforehand, the value |VA−VB| and the value VD are compared with each other. The value obtained as a result of this comparison is represented by DD.

FIG. 6 shows, in detail, a part C of the circuit of FIG. 3. The integrated voltages VA and VB are added up by resistors 225 and 226 of a resistance value R, and a voltage value 0.5 (VA+VB) is applied to each of the positive input terminals of comparators 227 and 228. The negative input terminal of each of the comparators 227 and 228 has a voltage value of 0.5 VL or 0.5 VH applied thereto. The comparators 227 and 228 thus compare the value (VA+VB) with the values VL and VH and respectively produce comparison output values LL and HH.

FIG. 7 shows, in detail, a part D of the circuit of FIG. 3. The integrated voltages VA and VB are directly compared with each other by a comparator 229, which then produces a comparison value output AB.

FIG. 8 shows, by way of example, another method for obtaining the comparison value DD from the integrated voltages VA and VB. In this case, the voltages VA and VB are applied to the positive input terminals of comparators 230 and 231 and are further applied via resistors 232 and 233 of a resistance value R to the negative input terminals of the comparators 230 and 231. These negative input terminals are also connected to constant current sources 234 and 235. With such an arrangement, these negative input terminals have voltages VB+iR and VA+iR applied thereto, respectively. (NOTE: "i" represents the current value of the constant current sources 234 and 235). The outputs of the comparators 230 and 231 are supplied to an OR circuit 236, which then produces the output (or the comparison value) DD. This output DD becomes true logic in the event that VA−VB>iR=VD or VA−−VA>iR=VD and represents logic |VA−VB|>VD.

FIG. 9 shows a situation in which part of the sequence control circuit 111 is embodied by hardware means. A clock CL determines the minimum period of the sequence control circuit 111 and serves as a signal source for light emission modulation of the light projecting element 3 and the synchronizing signal SYNC for the synchronized detection circuits 102a and 102b. A counter 236 counts an n-number and produces an output Cn which determines the period of distance measurement and the maximum integration time. Flip-flops 237 and 238 are set by the signals DD and HH, respectively, and are reset by the signal Cn at every period of distance measurement. Respective outputs DDQ and HHQ of the flip-flops 237 and 238 are integration terminating signals. These signals DDQ and HHQ are supplied through an OR circuit 239 to a flip-flop 240 to be held there according to the period of the signal Cn. Inverting output $\overline{Q}$ of the flip-flop 240 becomes an infinity signal FAR. The signals FAR and DDQ go through an OR circuit 241 to set a flip-flop 242, which then produces a motor rotation signal MO. This flip-flop 242 is also reset by the integration terminating or in-focus signal HHQ. At the time of an in-focus condition, the motor rotation signal MO is inhibited from being produced and the motor 8 is thus stopped. The signal AB is renewed into a signal ABQ by a flip-flop 243 in response to the signal DDQ, which represents an out-of-focus condition. In this case, the signal AB becomes true logic at the time of a near-focus state, i.e. VA>VB. The signals ABQ and FAR become a signal FN indicating the rotating direction of the motor 8 through an OR circuit 244. A final motor driving signal FF (in the direction of an infinity distance position) or NN (in the direction of a nearest distance position) is selected based on the output of an AND circuit 245 which receives the signals FN and MO or the output of an AND circuit 247, which receives the signal FN through a NOT circuit 246 and the signal MO.

In a case where both the signals DDQ and HHQ are of false logic and are supplied through the OR circuit 239 and a NOT circuit 248 to an AND circuit 249, the synchronizing signal SYNC is produced in synchronization with the output CLK of the clock CL which is supplied to the AND circuit 249. An integration resetting signal CLR produced by an OR circuit 250 becomes true logic and so remains until resumption of a next integrating process after termination of integration is decided jointly by the output of the OR circuit 239 and the signal Cn supplied to the OR circuit 250.

The motor 8 is changed over between a high speed and a low speed depending upon a high or low level signal LOW supplied to the motor driving circuit 113. In the event of the conditions |VA−VB|32 VD and VA+VB<VL, the signal LL is at a low level, so that the motor 8 rotates at a high speed. On the other hand, in the event of the conditions |VA−VB|=VD and VA+VB>VL, the signal LL is at a high level and the signal LOW is at a high level, so that the motor 8 rotates at a low speed.

FIG. 10 shows waveforms of the signals of FIG. 9 observed when the focusing condition changes as follows: A near-focus state→a far-focus state→an in-focus state→an infinity distance state. In the event of a near-focus state, the signal DD first rises. At this instant, the signal AB is at a high level. In the event of a far-focus state, the signal DD also first rises while the signal AB is at a low level. In the event of an in-focus state, the signal HH rises. In the event of an infinity distance state, the end of a maximum integration time comes before any of the signals rise.

PROBLEMS OF THE PRIOR ART

In the above-described automatic focus detecting device having the light projecting element 3 for projecting light onto the object 5 and the light receiving element 6 for receiving the light reflected by the object, if the quantity of light emission of the light projecting element 3 is increased to broaden the range of distance measurement, in the case of the object 5 being highly reflective, the quantity of light reflected by the object 5 is increased. Therefore, in such a case, a processing circuit for processing an output signal of the light receiving element 6 is not able to accurately operate in response to an increase in the output signal of the light receiving element 6.

For example, when light is projected onto the highly reflective object 5 even if an imaging optical system is in an out-of-focus state, the light receiving element 6 produces the same output signal as when the imaging optical system is in an in-focus state, under the influence of the high reflection factor of the object 5. As a result, a signal processing circuit which receives the output signal of the light receiving element 6 produces an erroneous in-focus signal. Furthermore, if the quantity of light emission is decreased to avoid the above problem, the range of distance measurement narrows and the performance of the automatic focus detecting device AF lowers.

It is an object of the present invention to solve the above problems.

It is another object of the present invention to control the quantity of light emitted from the light projecting element 3 for focus detection in such a manner that the quantity of light emission is increased after the lapse of a predetermined time counted by the counter 236 for counting a time of light emission of the light projecting element 3 from the start thereof. That is, the quantity of light emission is restrained for a predetermined time from the start of light emission and is increased after the lapse of the predetermined time.

Further objects and features of the present invention will be apparent from the following detailed description of the preferred embodiments thereof with reference to the accompanying drawings.

SUMMARY OF THE INVENTION

To attain these objects, a light emission quantity control device for focus detection includes light emitting means for projecting light for focus detection onto an object to be photographed, light receiving means for receiving light reflected by the object, periodical signal generating means for generating a periodical signal to determine the period of light emission of the light emitting means on the basis of an output of the light receiving means, drive means for driving the light emitting means and changeover means for changing and controlling input energy supplied to the light emitting means by the drive means, in which the quantity of light emission of the light emitting means is changed by the changeover means.

BRIEF DESCRIPTION OF THE DRAWINGS

FIG. 3 is a circuit diagram associated with the automatic focus detecting device AF in an embodiment of the present invention.

DETAILED DESCRIPTION OF THE PREFERRED EMBODIMENTS

Figure 1:
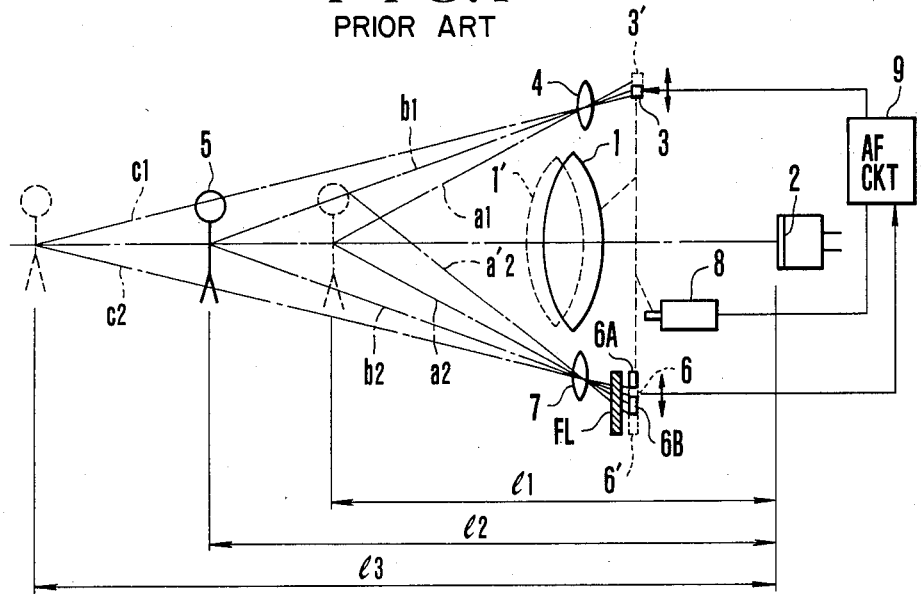
FIG. 1 is a schematic illustration of the arrangement of an automatic focus detecting device AF to which the present invention is applied.
Figure 2A:
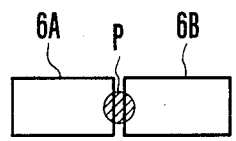
FIGS. 2(a) and 2(b) are schematic illustrations of the light receiving element 6.
Figure 2B:
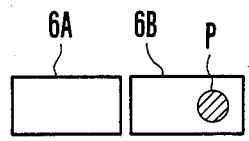
Figure 4:
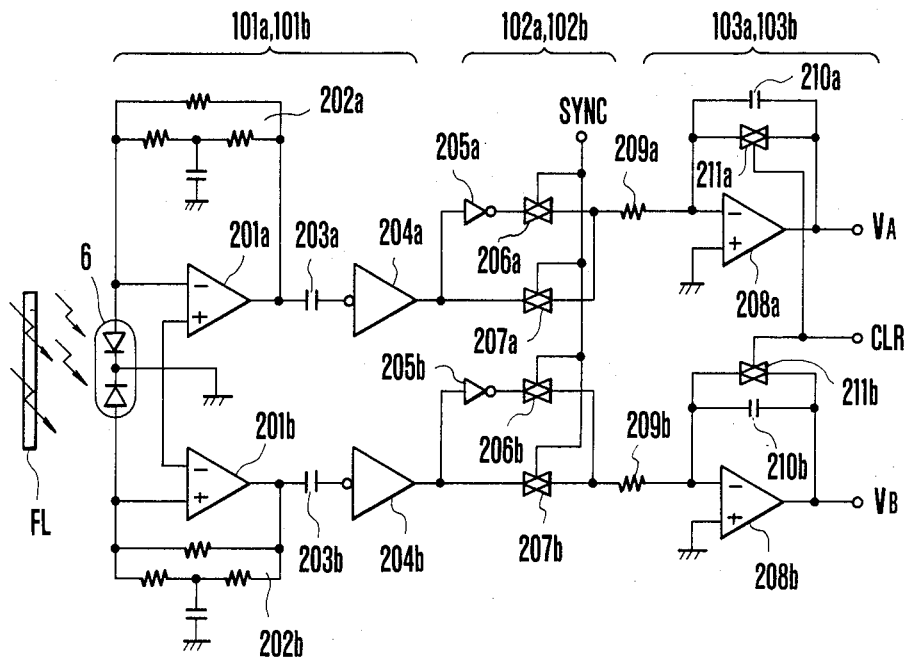
FIGS. 4 through 8 are circuit diagrams of the various circuit blocks of FIG. 3.
Figure 5:
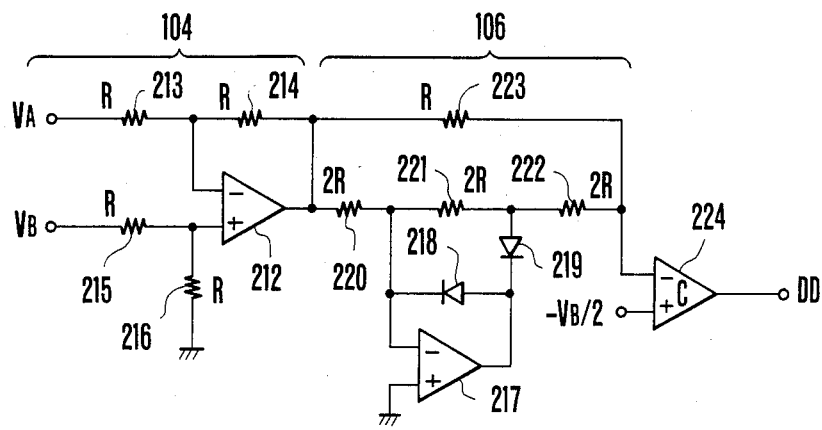
Figure 6:
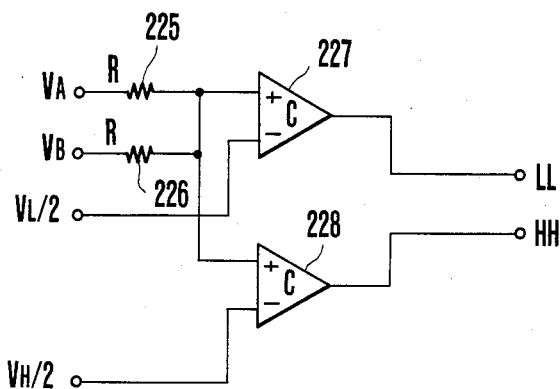
Figure 7:
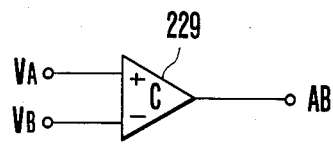
Figure 8:
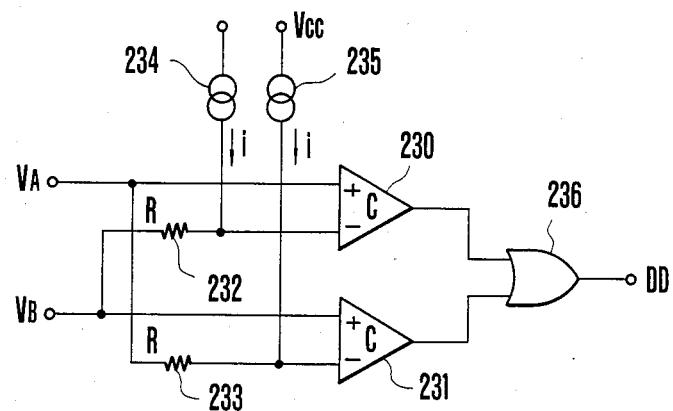
Figure 9:
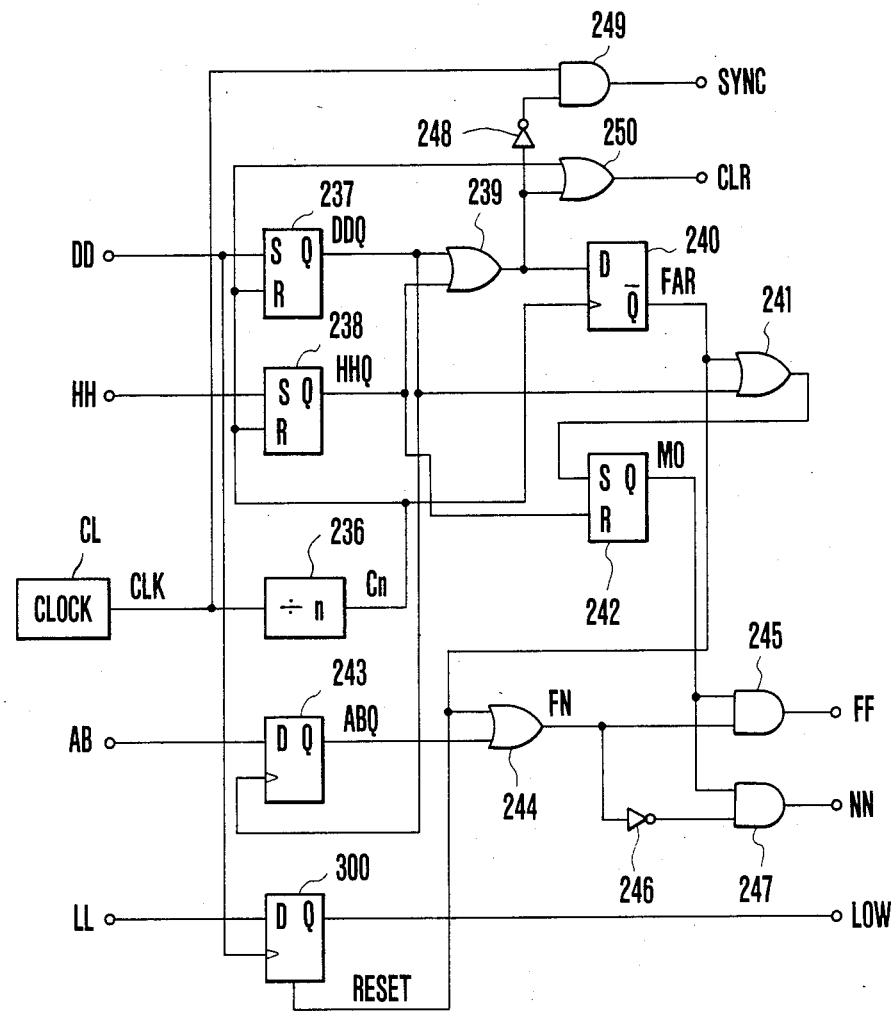
FIG. 9 is a circuit diagram of a sequence control circuit shown in FIG. 3.
Figure 10:
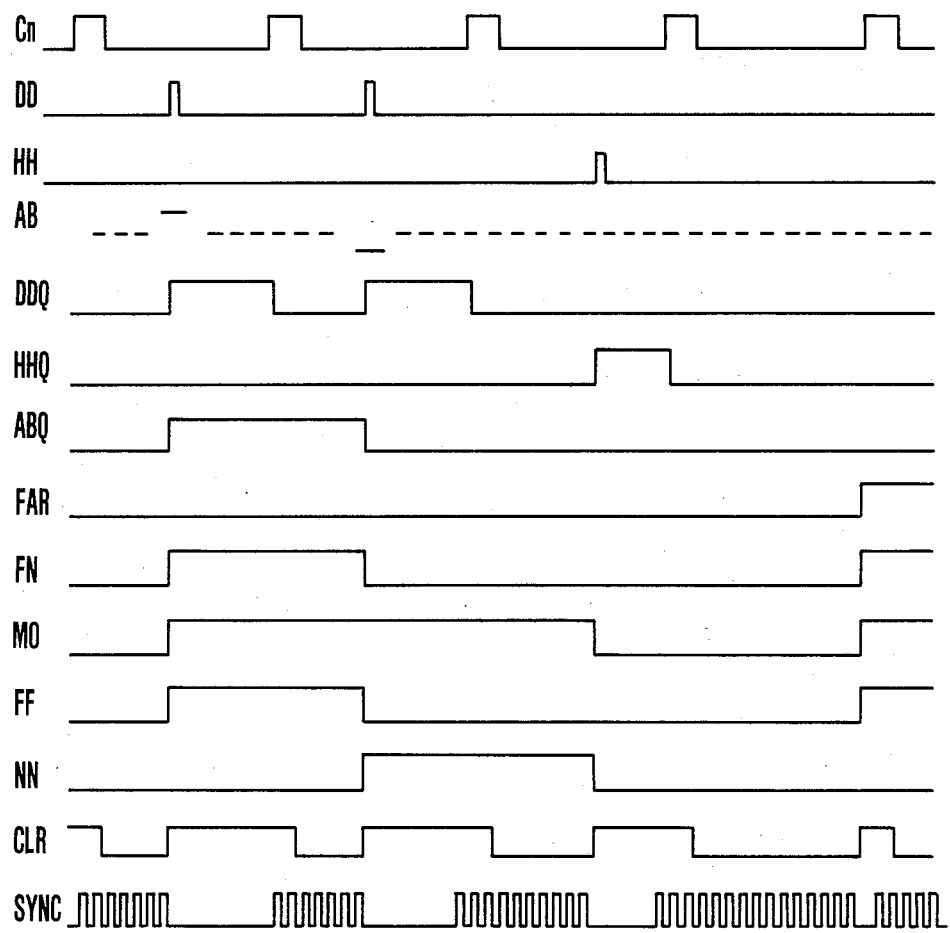
FIG. 10 is a waveform chart showing the waveforms of the various signals shown in FIGS. 13 through 9.
Figure 11:
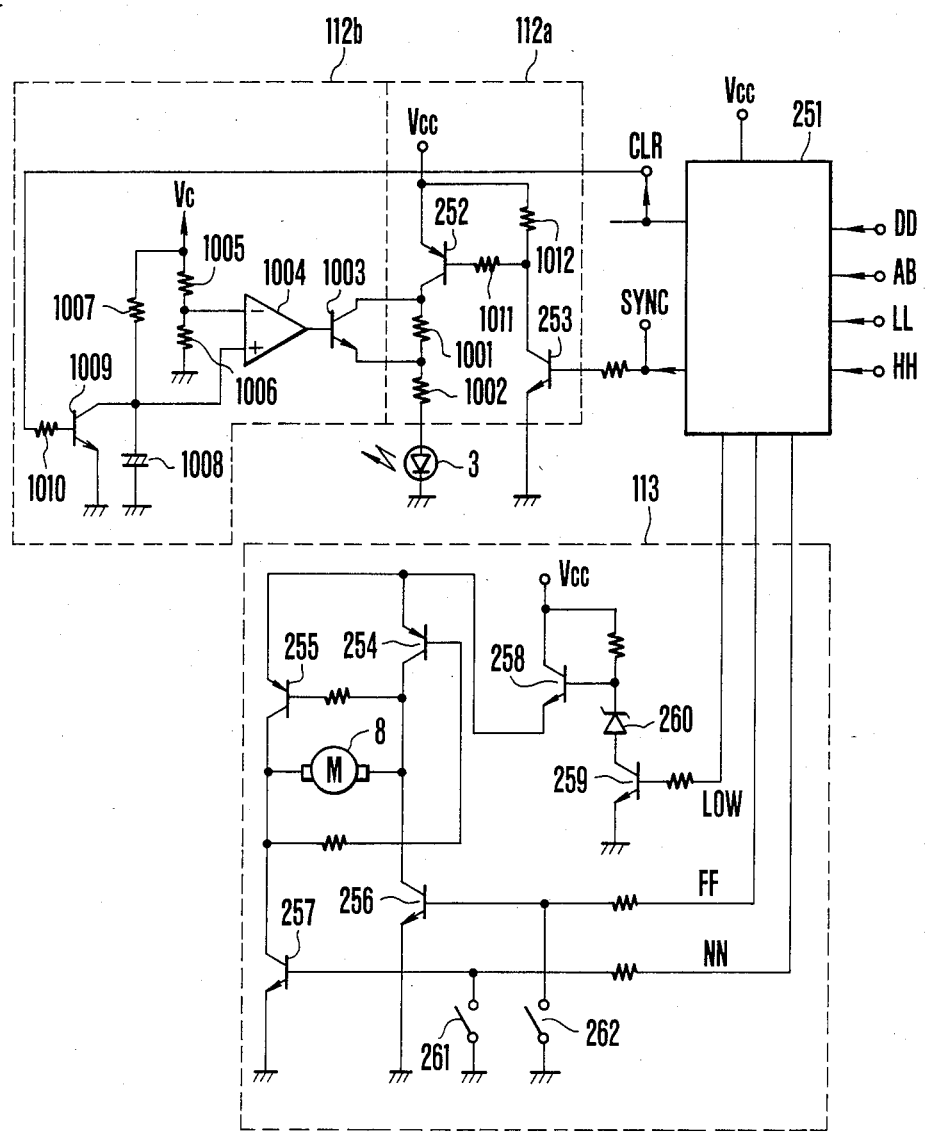
FIG. 11 is a circuit diagram of a circuit for controlling light emission according to the present invention.
Figure 12:
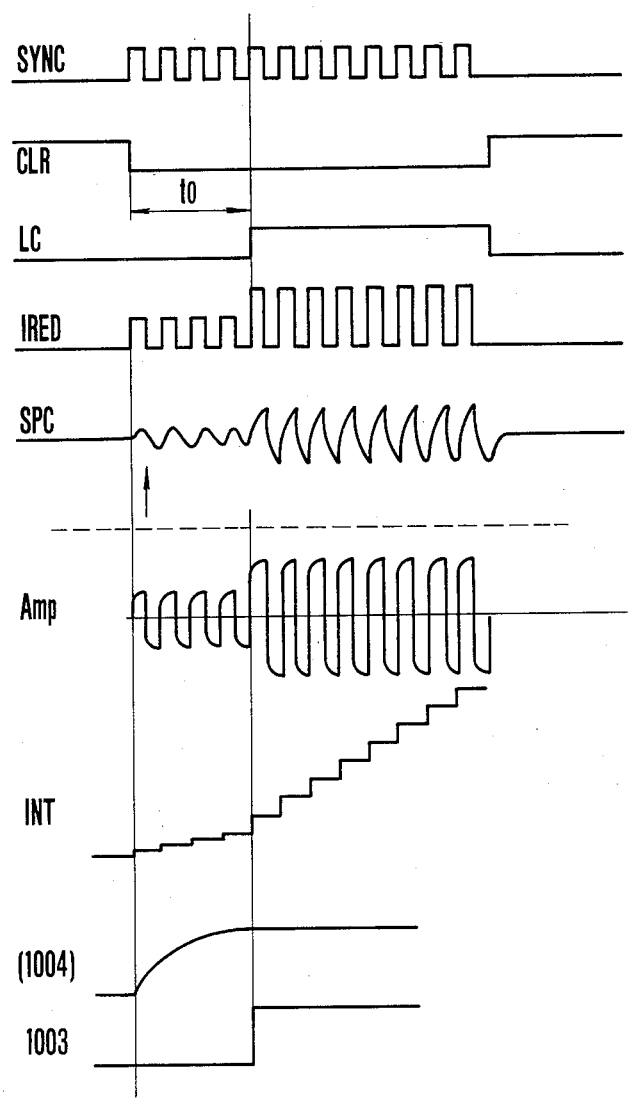
FIG. 12 is a waveform chart of the various signals shown in FIG. 11.

FIG. 11 is a circuit diagram of a circuit for controlling light emission in an embodiment of the present invention. FIG. 12 is a waveform chart of main signals shown in FIG. 11.

A micro-computer 251 produces the clearance signal CLR, the synchronizing signal SYNC, and the motor driving signals FF and NN on the basis of the signals DD, AB, LL and HH processed by the circuit of FIG. 3.

The light emission quantity control circuit 112b counts a predetermined time from the start of light emission of the light projecting element 3 in response to the clearance signal CLR produced by the micro-computer 251, and controls the operation of the light emission driving circuit 112a. The light emission quantity control circuit 112b includes an amplifier 1004, a differentiation circuit composed of a resistor 1007 and a capacitor 1008, transistors 1003 and 1009, resistors 1005, 1006 and 1010, etc.

The light emission driving circuit 112a controls light emission from the light projecting element 3 in response to a signal produced by the light emission quantity control circuit 112b, and includes transistors 252 and 253, resistors 1001, 1002, 1011 and 1012, etc.

While the synchronizing signal SYNC is supplied to the synchronized detection circuits 102a and 102b, it is also used for driving the light projecting element 3 to become a light emitting output IRED. Electrical signals produced by the light receiving element 6 have the waveform represented by a signal SPC with an external light component such as sunlight or artificial light superimposed on the reflected light component of a projected infrared ray. The signal SPC is supplied to the amplifiers 101a and 101b to become a signal Amp. When the clearance signal CLR is released at the same time as commencement of light emission, the clearance signal CLR, as shown in FIG. 12, is supplied to the light emission quantity control circuit 112b through the resistor 1010. In response to the clearance signal CLR, the transistor 1009 is turned on. The output of the transistor 1009 is supplied to the amplifier 1004 through the differentiation circuit, composed of the resistor 1007 and the capacitor 1008. The amplifier 1004 produces an output having the waveform represented by (1004) shown in FIG. 12. In accordance with the waveform (1004) of the output of the amplifier 1004, a voltage is applied to a base terminal of the transistor 1003. The transistor 1003 is kept off until the voltage reaches a predetermined level. Therefore, the light emission driving circuit 112a supplies a small current I1 to the light projecting element 3 under the influence of the resistors 1001 and 1002 connected in parallel between a collector terminal of the transistor 252 and the light projecting element 3.

Accordingly, when the transistor 1003 is off, a current supplied to the light projecting element 3 is small, so that the quantity of light emission is also small. Therefore, the transistor 1003 restricts the light emission quantity for a predetermined time after light emission begins.

When a predetermined time t0 has passed after the start of light emission from the light projecting element 3, an output voltage of the amplifiers 1004 exceeds a predetermined value turning the transistor 1003 on. When the transistor 1003 is turned on, a current supplied to the light projecting element 3 is released from the influence of the resistor 1001 to become a large current I2, so that light emission increases.

Output signals Amp of the amplifiers 101a and 101b have a small waveform for the predetermined time t0 after the start of light emission, and, after the lapse of the predetermined time t0, have a large waveform based on an increase in the quantity of light emission.

Figure 13:
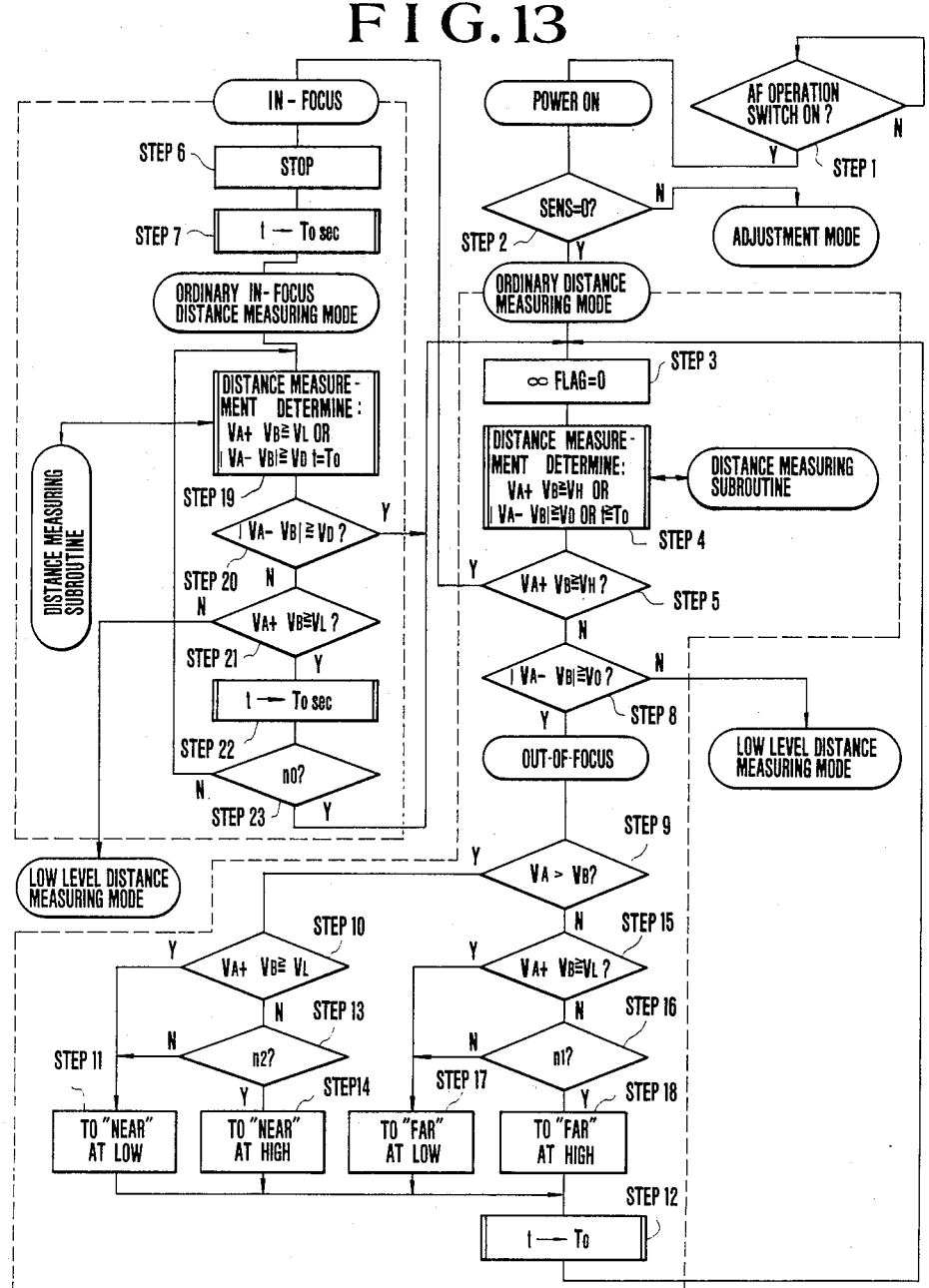
FIG. 13 is a flow chart showing the operation of the automatic focus detecting device AF according to the present invention.

FIG. 13 is a flow chart showing the operation of the automatic focus detecting device AF, in which focus detection is effected in accordance with the various output signals of the circuits of FIG. 3 and the FIG. 11. In the following, the operation is explained in the order of the flow chart number.

Step 1: The control circuit 111 begins to operate when an AF operation switch (not shown) is closed.

Step 2: First, an input terminal SENS of the control circuit 111 is checked to find whether or not it is at a high level. If the input terminal SENS is at a high level, the operation is performed in an adjustment mode, and, in that event, no distance measurement action is performed. In the adjustment mode, the on-and-off action of the light projecting element 3 is performed and the outputs of the light receiving element 6 are integrated over a period of time T0. The amplification circuits 101a and 101b for IC offset adjustment, the synchronized detection circuits 102a and 102b and the integration circuits 103a and 103b are adjusted. Furthermore, the relative position of the light projecting element 3 or the light projecting lens 4, the light receiving element 6, the light receiving lens 7, etc. is adjusted by an adjusting mechanism (not shown). Since the AF operation switch is closed when the input terminal SENS of the control circuit 111 is at a low level, the automatic focus detecting device first operates in an ordinary distance measuring mode in the following manner.

Step 3: In the ordinary distance measuring mode, first, a flag ∞ is reset. The flag ∞ is a signal indicates whether or not an object 5 to be photographed is at an infinity distance position. When the object 5 is at an infinity distance position, the signal ∞ =1 is produced and the motor 8 rotates in response to the high speed signal FF to shift the optical system in the infinity distance direction.

When the signal ∞ =0 is produced, that is, when the object 5 is not at an infinity distance position, distance measurement begins in the next step 4.

Step 4: The control circuit 111 begins to perform a distance measuring action. First, the circuit 111 drives the light emission driving circuit 112 and the synchronized detection circuits 102a and 102b synchronization with the synchronizing signal SYNC and, at the same time, releases the integration circuits 103a and 103b from a cleared state. Then, in synchronization with the synchronizing signal SYNC, the light spot image P is projected with infrared rays from the light projecting element 3 onto the object 5. A reflected light flux resulting from this is received by the light receiving element 6. At the light receiving element 6, the two photo-sensitive areas 6A and 6B produce electrical signals corresponding to the quantity of light received based on the position of the reflected light spot image P received on the light receiving element 6. The electrical signals are amplified by the amplifiers 101a and 101b and are subjected to a synchronized detection process at the synchronized detection circuits 102a and 102b. The information signals thus obtained are gradually integrated respectively at the integration circuits 103a and 103b until the outputs of the integration circuits become the integrated voltages VA and VB. The integrated voltages VA and VB are computed and processed, as mentioned in the foregoing, into the four digital information signals as described in the following paragraphs (a)-(d) and are supplied to the control circuit 111:

(a): The difference signal VA−VB is produced from the subtracter 104 and is supplied to the absolute value circuit 106. The absolute value |VA−VB| thus obtained is compared by the comparator 107 with the comparison value VD. A result of this comparison is produced from the comparator 107 as the digital signal DD.

(b): A sum signal VA+VB produced from the adder 105 is compared by the comparator 108 with the comparison value VL to become the digital signal LL.

(c): The sum signal VA+VB produced from the adder 105 is compared by the comparator 109 with the comparison value VH (VH>VL) to become the digital signal HH.

(d): The values of the signals VA and VB are compared with each other by the comparator 110 to become the digital signal AB.

At the control circuit 111, on the other hand, time detecting means provided within the microm measures the signal integrating time of the integration circuits 103a and 103b, i.e. the projecting time of the light projecting element 3. Assuming that the integrating time is "t", the length of this time "t" is compared with the maximum integrating time T0. With all the information signals mentioned above obtained, the control circuit 111 determines whether or not the following conditions have been obtained: |VA−VB|≧VD or VA+VB≧VH or t≧T0. If any one of the three conditions is satisfied, the control circuit 111 judges the distance measuring action to have been completed.

Figure 14A:
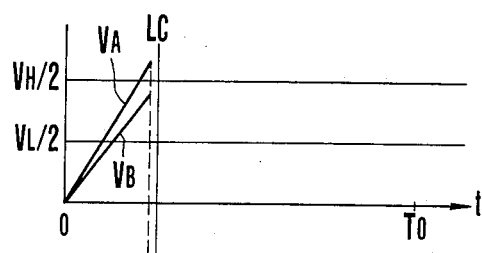
FIGS. 14(a) through 14(d) are illustrations showing the output states of integrated signals shown in FIG. 3.
Figure 14A:
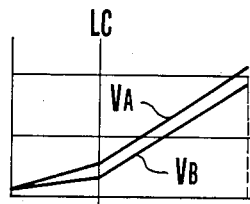
Figure 14B:
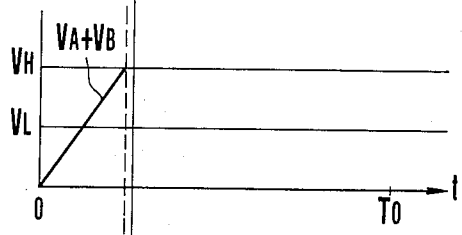
Figure 14B:
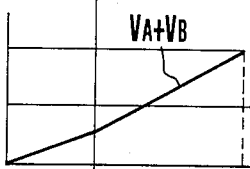
Figure 14C:
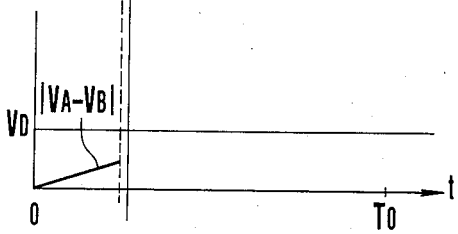
Figure 14C:
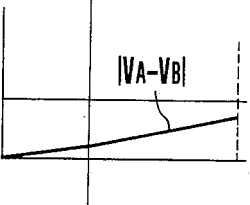
Figure 14D:
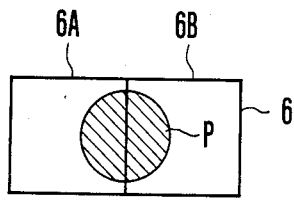

FIGS. 14(a)–14(d) show the conditions of the reflected light spot image P and the integrated signals VA and VB obtained under an in-focus condition. Under the in-focus condition, the reflected light spot image P is formed at a point midway between the photo-sensitive areas 6A and 6B of the light receiving element 6 as shown in FIG. 14(d). Under that condition, therefore, the photo-sensitive areas 6A and 6B produce outputs of about the same value. The values of the integrated signals VA and VB thus become about equal to each other and increase rapidly as shown in FIG. 14(a). This causes the signal VA+VB to also rapidly increase with the time "t" as shown in FIG. 14(b). On the other hand, the signal |VA−VB| does not increase much as shown in FIG. 14(c). Therefore, when these signals in comparison with the comparison values VH and VD and the maximum integrating time T0 are in the states of VA+VB≧VH, |VA−VB|<VD and t<T0 an in-focus state is judged to have been attained.

FIGS. 14(a)′, 14(b)′ and 14(c)′ show the waveforms of the output signals VA and VB, VA+VB and |VA−VB|, respectively, in a case where the quantity of light emission of the light projecting element 3 is small for a predetermined time from the start of light emission and increases after the lapse of the predetermined time. In this case, rates of increase of the values of the signals VA and VB, VA+VB and |VA−VB| vary as shown in FIGS. 14(a)′-14(b)′ when the signal LC, shown in FIG. 12, representing the lapse of the predetermined time t0 from the start of light emission is produced.

On the other hand, if the level of a driving current supplied to the light projecting element 3 is held constant from the start of light emission as shown in FIGS. 14(a), 14(b) and 14(c), when the distance of an object having a high reflection factor is measured, the sum signal VA+VB produced by the adder 105 exceeds the comparison signal VH in short time from the start of light emission and the absolute value signal |VA−VB| has a very small value.

Therefore, the present invention is constituted in such a manner that the quantity of light emission is small for a predetermined time from the start of light emission and is large after the lapse of the predetermined time, so that the output levels of the various output signals can be adjusted as shown in FIGS. 14(a)', 14(b)' and 14(c)' and accurate focus detection can be effected even for an object having a high reflection factor.

What is claimed is:

1. A light emission quantity control device for focus detection comprising:
    light emitting means for projecting light for focus detection onto an object to be photographed;
    light receiving means for receiving light reflected by said object to produce an output;
    information forming means for forming an information of a distance to an object;
    signal generating means for generating a synchronizing signal to synchronize a light emission period of said light emitting means with the receipt of the output of said light receiving means by said information forming means;
    drive means responsive to said synchronizing signal for driving said light emitting means; and
    restraint means for restraining the quantity of light emission of said light emitting means for a predetermined time from the start of light emission.

2. A light emission quantity control device according to claim 1, further comprising control means for producing a control signal to control the operation of said restraint means, said restraint means including count means for counting a time, said count means increasing the quantity of light emission of said light emitting means by increasing output energy of said drive means in response to said control signal produced by said control means.

3. An automatic focus adjusting device for a camera comprising:
    light emitting means for projecting light for focus detection onto an object to be photographed;
    light receiving means including at least a pair of photo-sensitive elements for receiving light reflected by said object to produce an output;
    information forming means for forming an information of a distance to an object;
    signal generating means for generating a synchronizing signal to synchronize a light emission period of said light emitting means with the receipt of the output of said light receiving means by said information forming means;
    drive means for driving said light emitting means;
    signal forming means for forming a signal to control said drive means on the basis of said output produced by said light receiving means;
    control means responsive to said signal formed by said signal forming means for controlling said drive means, said control means including a changeover means for changing light emission energy of said light emitting means into a plurality of steps.

4. An automatic focus adjusting device according to claim 3, wherein said control means further includes switching means for controlling input energy supplied to said light emitting means, and wherein said light emission energy is changed over by opening and closing of said switching means.

5. An automatic focus adjusting device according to claim 4, wherein said control means further includes count means responsive to said signal formed by said signal forming means for producing an output, and wherein said switching means operates in response to said output of said count means.

6. An automatic focus adjusting device according to claim 5, further comprising resistance means arranged between said light emitting means and said drive means and connected to said switching means for changing a current supplied to said light emitting means.

* * * * *